(12) United States Patent
Sguotti et al.

(10) Patent No.: US 10,369,840 B2
(45) Date of Patent: Aug. 6, 2019

(54) HUB-BEARING UNIT WITH ROTOR HUB

(71) Applicant: Aktiebolaget SKF, Gothenburg (SE)

(72) Inventors: Laura Sguotti, Pinerolo (IT); Domenico Bosco, Borgaro Torinese (IT); Fabio Marchetti, Brescia (IT); Davide Antonio Olivieri, Turin (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/469,909

(22) Filed: Mar. 27, 2017

(65) Prior Publication Data

US 2017/0282644 A1 Oct. 5, 2017

(30) Foreign Application Priority Data

Apr. 5, 2016 (IT) ...................... 1020106000034826

(51) Int. Cl.
*B60B 27/00* (2006.01)
*B60B 27/06* (2006.01)
(Continued)

(52) U.S. Cl.
CPC ...... *B60B 27/0094* (2013.01); *B60B 27/0005* (2013.01); *B60B 27/0036* (2013.01); *B60B 27/065* (2013.01); *B60B 35/128* (2013.01); *B60B 35/18* (2013.01); *F16C 19/185* (2013.01); *F16D 3/2245* (2013.01); *F16D 3/34* (2013.01); *B60B 27/0073* (2013.01); *B60B 27/06* (2013.01); *F16C 23/086* (2013.01); *F16C 2240/70* (2013.01); *F16C 2326/02* (2013.01)

(58) Field of Classification Search
CPC .... F16C 19/184; F16C 19/185; F16C 19/186; F16C 19/187; F16C 2326/02; F16C 2240/40; F16C 2240/70; F16C 2240/80; F16C 23/086; B60B 27/0005; B60B 27/0036; B60B 27/0073; B60B 27/0094; B60B 27/06; B60B 27/065; B60B 36/128; B60B 36/18; F16D 3/34; F16D 3/2245
See application file for complete search history.

(56) References Cited

U.S. PATENT DOCUMENTS 4,424,047 A * 1/1984 Welschof ............ B60B 27/0005
384/544
4,917,510 A * 4/1990 Jacob .................. B60B 27/0005
384/503

(Continued)

FOREIGN PATENT DOCUMENTS

| EP | 0449345 A1 | 10/1991 |
| EP | 0908639 A2 | 4/1999 |
| EP | 2602123 A1 | 6/2013 |

*Primary Examiner* — Alan B Waits
(74) *Attorney, Agent, or Firm* — Bryan Peckjian; SKF USA Inc. Patent Dept.

(57) ABSTRACT

A hub-bearing unit is provided with: a rotatable hub, with an axially outer flange portion configured for engagement with a rotatable element of a motor vehicle, a bearing unit provided with a fixed radially outer ring, configured for engagement with a fixed element of the motor vehicle, a first, axially outer, crown of rolling bodies, and a second, axially inner, crown of rolling bodies, interposed between the radially outer ring and the hub. The hub also assumes the function of the radially inner ring of the bearing unit and the bell of a constant velocity joint. The hub-bearing unit is designed so that the axial distance between the center of the axially inner crown of rolling bodies and the rolling center of the constant velocity joint lies within a predetermined range according to the following formula:

$$\begin{cases} \text{with } L \geq 0, & 0.4 \leq \dfrac{P_B}{S+A+L} \leq 4 \\ \text{with } L < 0, & 0.5 \leq \dfrac{P_B}{S+A} \leq 4 \end{cases}$$

7 Claims, 4 Drawing Sheets

(51) Int. Cl.
    *F16C 19/18*      (2006.01)
    *B60B 35/12*      (2006.01)
    *B60B 35/18*      (2006.01)
    *F16D 3/34*       (2006.01)
    *F16D 3/2245*    (2011.01)
    *F16C 23/08*     (2006.01)

(56) References Cited

U.S. PATENT DOCUMENTS

| | | | |
|---|---|---|---|
| 4,950,206 A | | 8/1990 | Jacob |
| 5,975,767 A | * | 11/1999 | Mizukoshi .......... B60B 27/0005 277/321 |
| 6,497,515 B1 | * | 12/2002 | Sahashi ................ B60B 27/00 29/898.062 |
| 7,850,530 B2 | * | 12/2010 | Cermak ................ B60B 27/00 464/178 |
| 8,052,537 B2 | * | 11/2011 | Niebling ............... B60B 27/00 464/178 |
| 2006/0120650 A1 | * | 6/2006 | Niebling ............... B60B 27/00 384/544 |
| 2009/0180726 A1 | * | 7/2009 | Siebeneick ............. B60B 3/02 384/512 |
| 2009/0206649 A1 | * | 8/2009 | Niebling ............... B60B 27/00 301/110.6 |
| 2011/0254353 A1 | * | 10/2011 | Ciulla ................ B60B 27/0005 301/109 |
| 2016/0319876 A1 | * | 11/2016 | Serafini ................ F16C 19/18 |

* cited by examiner

HUB-BEARING UNIT WITH ROTOR HUB

CROSS REFERENCE TO RELATED APPLICATIONS

This application claims priority to Italian patent application no. 102016000034826 filed on Apr. 5, 2016, the contents of which are fully incorporated herein by reference.

FIELD OF THE INVENTION

The present invention relates to a hub-bearing unit comprising a hub configured in the form of a rotor. In particular, the unit incorporates the constant velocity joint within it. The unit in question is suitable for applications in which the inner ring of the bearing is rotatable, or for applications to a drive wheel of a motor vehicle.

BACKGROUND OF THE INVENTION

Hub-bearing units of the flanged type, for applications to drive wheels of motor vehicles, are known from the prior art. The document EP 2 602 123 A1, for example, describes a hub-bearing unit, which is asymmetrical in this case, for the wheel of a motor vehicle, comprising a flanged hub rotatable about an axis of rotation, a flange fixed to the flanged hub and placed transversely to the axis of rotation, a fixed ring positioned radially outside the flanged hub and provided with races axially spaced apart from each other, and two crowns of rolling bodies (such as balls) positioned between the fixed ring and the flanged hub. The flanged hub integrally forms a radially inner race for the axially outer crown of balls, while the radially inner race for the crown of axially inner balls is formed on an inner ring of the bearing, fitted radially and externally on to the flanged hub.

An embodiment of this type, especially when used in applications which are demanding in terms of transmitted loads, creates considerable local loads between the rings and the rolling bodies of the bearing; moreover, this embodiment cannot be used to produce a very strong or highly durable bearing.

Finally, it usually has large axial overall dimensions, due to the presence of the flange portion fixed to the flanged hub and transverse to the axis of rotation, and also because the axial lengths of the flanged bearing and the constant velocity joint will be added to one another when these components are mounted on the vehicle.

It should also be borne in mind that, while motor vehicle manufacturers require constant improvement in the performance of bearings, especially in terms of strength or at least rigidity, they also demand the provision of such performance in products at no extra cost, or even at lower cost. At the same time, motor vehicle manufacturers, aiming to comply with statutory requirements for continually decreasing $CO_2$ emissions, are increasingly coming to view the weight of a vehicle as an essential parameter. The weight of all the components of the vehicle has to be reduced. An increase in the strength of a bearing will not usually be acceptable if it comes at the cost of a non-negligible increase in the weight of the component. It should also be borne in mind that many manufacturers no longer require individual components, but need pre-assembled modules, which are much simpler to handle for mounting on a car.

In order to improve the performance, and especially the strength of the bearing, the distance between the pressure centers must be increased. This may be done by increasing the diameter of the circumference of the centers of the rolling bodies (known as the pitch diameter) of the bearing. Such solutions are known and have been developed in order to improve performance to a substantial degree. Increasing the pitch diameter has the drawback that the volume, and therefore the weight, also increase dramatically, with the square of the value of the pitch diameter. This weight increase is usually unacceptable to motor vehicle manufacturers.

Another improvement can be made by providing a further increase in the diameter of the circumference of the centers of the rolling bodies, so that the constant velocity joint can be fitted into the bearing and the part known as the bell of the joint can be integrated with the hub, that is to say with the inner ring of the bearing. Clearly, the integration of the components enables both the weight and the cost of the whole unit to be reduced. The weight and cost can be reduced further by also integrating the small inner ring of the bearing, in the axially inner position, with the bell of the joint. In other words, the hub acts as a single inner ring of the bearing and as the bell of the constant velocity joint.

Clearly, these design guidelines are not sufficient in themselves for the development of a novel hub-bearing unit which has considerable strength while also being light, at no added cost.

BRIEF SUMMARY OF THE INVENTION

The object of the present invention is to provide a hub-bearing unit, for application to a drive wheel of a motor vehicle, which is characterized by strength and lightness, without entailing increased costs.

This is done not only by increasing the diameter of the circumference of the centers of the rolling bodies of the bearing, by fitting the constant velocity joint into the bearing and integrating the part known as the bell of the joint with the hub (that is to say, with the inner ring of the bearing), but, above all, by designing the significant dimensions of the whole unit in such a way as to provide a unit having high strength combined with limited weight.

According to the present invention, a hub-bearing unit is described, having the characteristics stated in the appended independent claim.

Further preferred and/or particularly advantageous embodiments of the invention are described according to the characteristics stated in the appended dependent claims.

BRIEF DESCRIPTION OF THE SEVERAL VIEWS OF THE DRAWING

The invention will now be described with reference to the attached drawings, showing some non-limiting exemplary embodiments of the invention, in which.

DETAILED DESCRIPTION OF THE INVENTION

Figure 1:
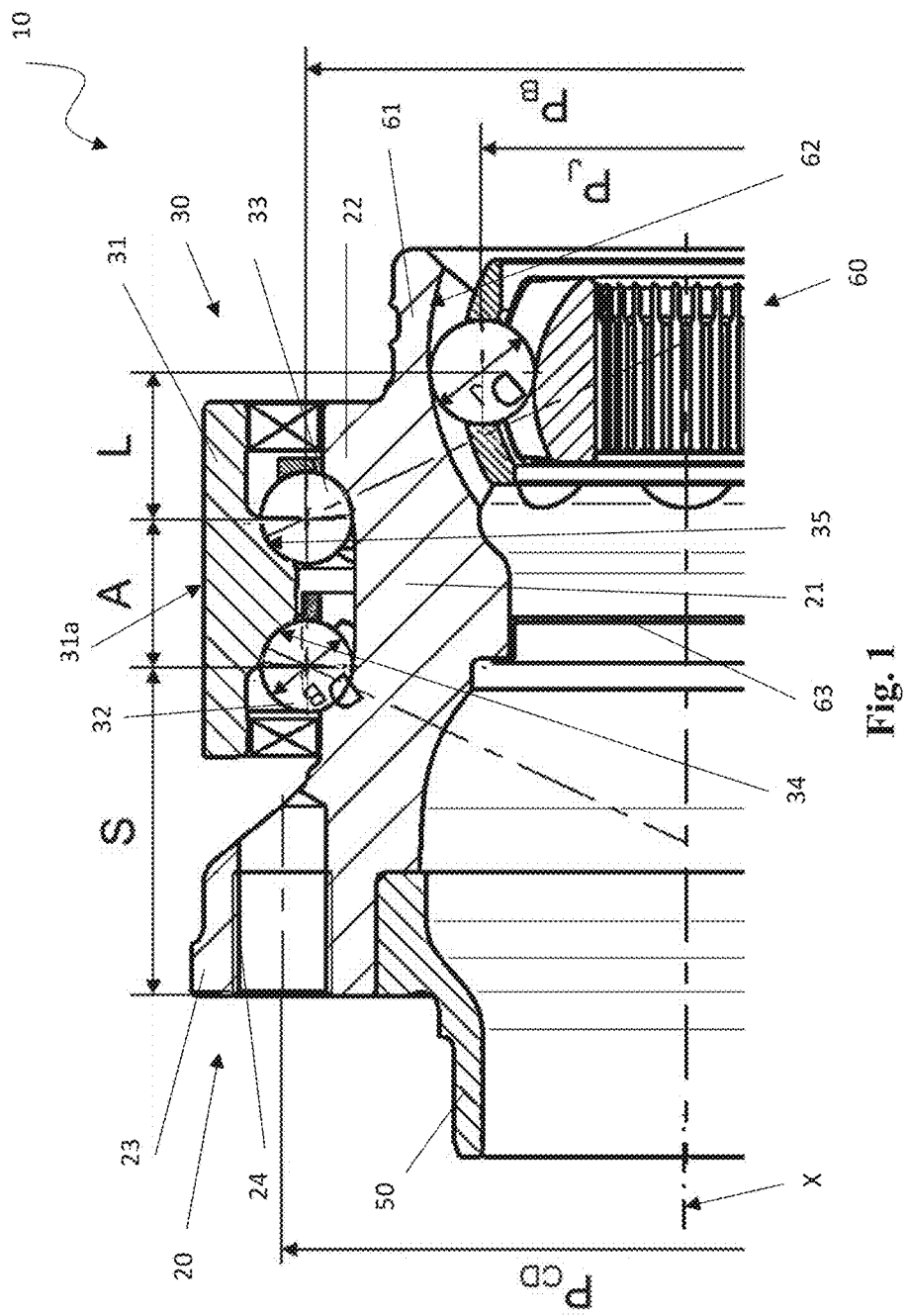
FIG. 1 is an axially symmetrical section through the hub-bearing unit according to a preferred embodiment of the present invention.

With reference to the drawings, a hub-bearing unit according to a first embodiment of the invention is indicated as a whole by 10.

The unit 10 comprises a hub 20 and a bearing unit 30. Throughout the present description and claims, any terms and expressions indicating positions and orientations such as "radial" and "axial" are to be interpreted as relating to the central axis of rotation X of the bearing unit 30. However, expressions such as "axially outer" and "axially inner" refer to the assembled condition, and in the present case preferably refer to a wheel side and to a side opposite the wheel side, respectively.

The bearing unit 30 comprises a fixed radially outer ring 31 and two rings of rolling bodies 32, 33, in this example balls, interposed between the radially outer ring 31 and the hub 20 which acts as the radially inner ring. To simplify the graphic representation, the references 32 and 33 are used to indicate both individual balls and rings of balls; in particular, 32 indicates the axially outer crown of balls or individual ball, and 33 indicates the axially inner crown of balls or individual ball. Also for the sake of simplicity, the term "ball" is frequently used by way of example in the present description and in the appended drawings, rather than the more generic term "rolling bodies" (and the same reference numerals are also used). However, it should be understood that any other rolling bodies (such as rollers, tapered rollers, needle rollers, etc.) may be used in place of the balls.

FIG. 1 shows the case of a symmetrical bearing, that is to say a bearing having the same pitch for both crowns of rolling bodies. The content of the rest of the present description is also applicable to the case of an asymmetrical bearing, the only substantial difference between the two bearing types being that, whereas the diameters of the circumferences of the centers of the rolling bodies of the corresponding rings 32, 33 have the same value PB in a symmetrical bearing, the aforesaid diameters differ from each other in an asymmetrical bearing. The radially outer ring 31, preferably in the shape of an axially extended tube, defines within itself the races 34, 35 for the corresponding rolling bodies of the crowns 32, 33.

The radially outer ring 31 has a radially outer cylindrical surface 31a adapted to be coupled to a cylindrical seat formed in a fixed element of the vehicle, for example a knuckle of a suspension, of a known type, which is not shown in the drawing. The cylindrical surface 31a extends over the whole of the axial dimension of the radially outer ring 31, and has an axial dimension of the same order of magnitude as that of the cylindrical seat of the knuckle.

The rolling bodies of the crowns 32, 33 rotate not only on the radially outer ring 31 but also on a central tubular portion 21 of hub 20, which defines a race 36 for the rolling bodies of the axially outer crown 32 and a race 37 for the rolling bodies of the axially inner crown 33. The aforesaid races 36, 37 are indicated for greater clarity in FIG. 2. The hub 20 therefore acts as a single inner ring, replacing the two inner rings which, as is well known, are commonly used in standard solutions for flanged hub-bearing units.

The hub 20 also defines a shoulder 22, on the axially inner side, and an axially outer flange portion 23. The flange portion has a plurality of axial fixing holes 24, the axes of which are placed along a circumference of diameter PCD with respect to the axis of symmetry X. These holes are the seats for the same number of fixing means (such as captive bolts, not shown in the drawing), which, in a known way, connect an element of the motor vehicle wheel, for example the brake disc (also of a known type, not shown in the drawing), to the hub 20.

Figure 2:
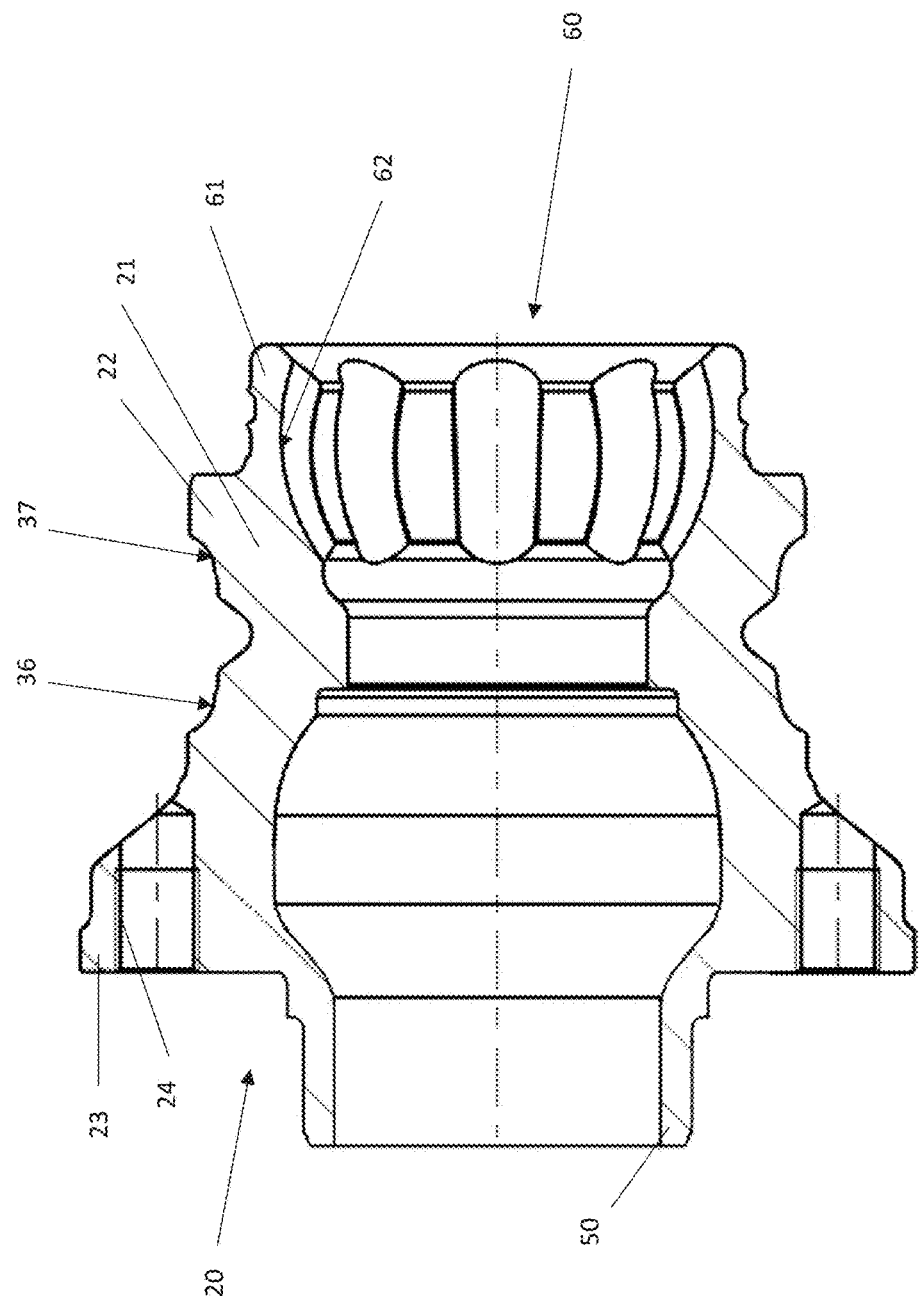
FIG. 2 is an axially symmetrical section through the hub-bearing unit, showing a second embodiment of the invention.

Advantageously, a bushing 50 for centering the wheel and the disc brake of the motor vehicle may be made from sheet metal, steel for example, and coupled to the flange portion 23 of the hub, preferably by a simple press-fitting operation. Alternatively, as shown in FIG. 2, this bushing 50 may be made in one piece with the hub 20.

Transmission of motion from a half-axle of the transmission assembly of a motor vehicle (not shown) is provided by a constant velocity joint 60. In particular, the outer bell of the joint 60 is integrated into the hub 20, which defines the race 62 of the joint in its axially inner terminal part 61. The grease is contained inside the constant velocity joint by isolating the joint from the outside by means of a protection cap 63.

Figure 3:
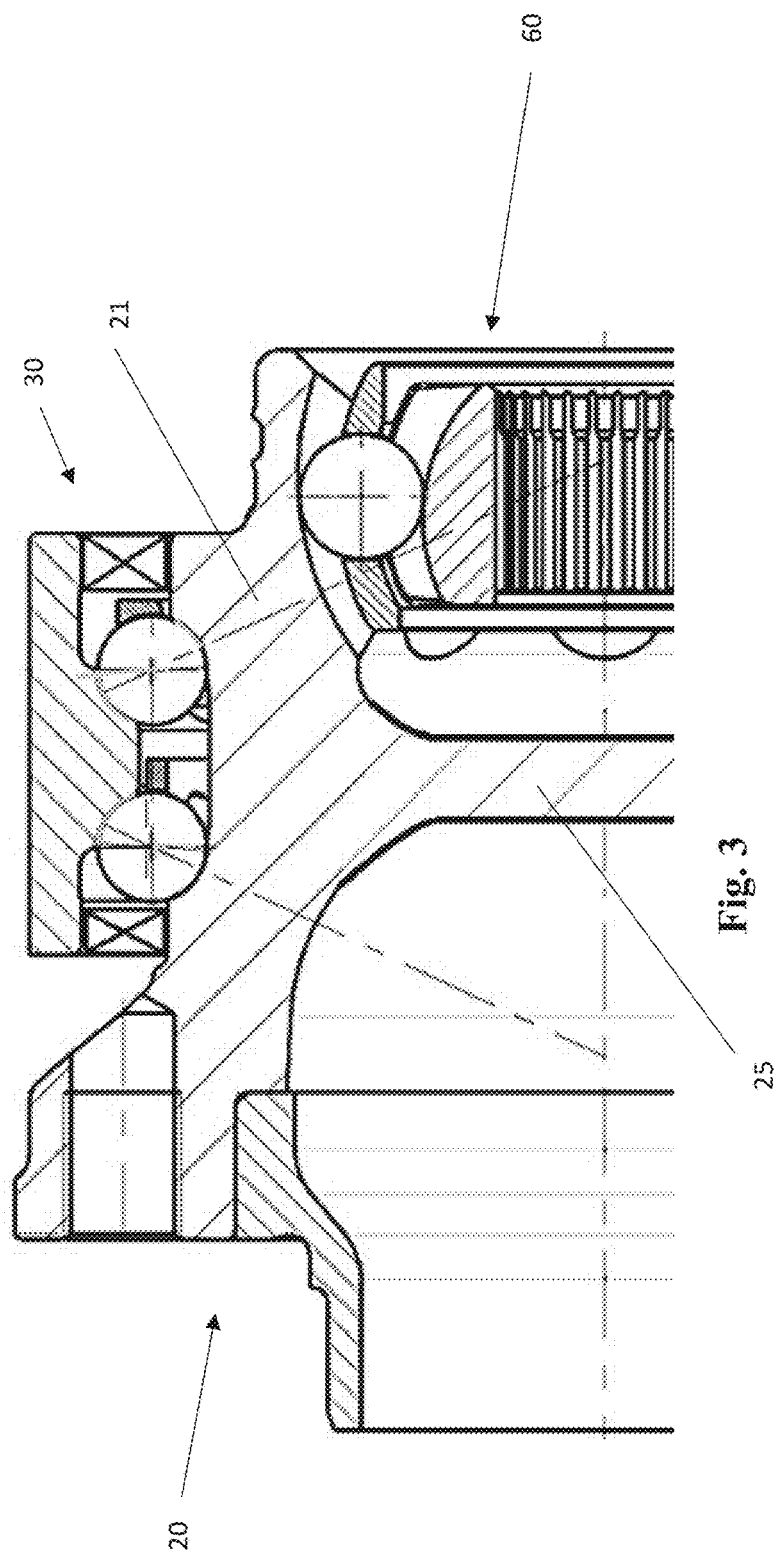
FIG. 3 is an axially symmetrical section through the hub-bearing unit, showing a third embodiment of the invention.

Alternatively, the protection cap could be dispensed with by forming the hub 20, as shown in FIG. 3, as a web structure with a discoid stiffening portion 25 which seals the space containing the constant velocity joint 60 from the external environment. The stiffening portion 25 may advantageously be provided with flutes to reduce its weight.

To increase the strength, the hub-bearing unit has been designed to as to increase considerably the pitch diameter PB of the two crowns of rolling bodies, raising it to a value close to that of the diameter PCD of the circumference of the axes of the axial fixing holes 24.

Additionally, since the two diameters PB and PCD are similar in value, the radial extension of the flange portion 23 of the hub 20 can be reduced. Thus the unit has a more tubular shape, like a kind of rotor, by comparison with the T-shape of standard solutions. Thus the effect of the bending moment exerted on the hub flange by the wheel is considerably reduced, with a consequent reduction in the forces applied to the rolling bodies of the bearing itself.

Moreover, the increased pitch diameter enables the constant velocity joint 60 to be fitted inside the unit and enables the bell of the joint to be integrated into the hub 20, that is to say into the inner ring of the bearing. The integration of the components limits both the weight and the cost of the unit as a whole.

Finally, if the bushing 50 is also integrated into the hub 20, as in the embodiment shown in FIG. 2, the total number of components of the unit is reduced by two.

Thus the unit is optimized by the suitable design of certain geometrical characteristics of the unit.

Figure 4:
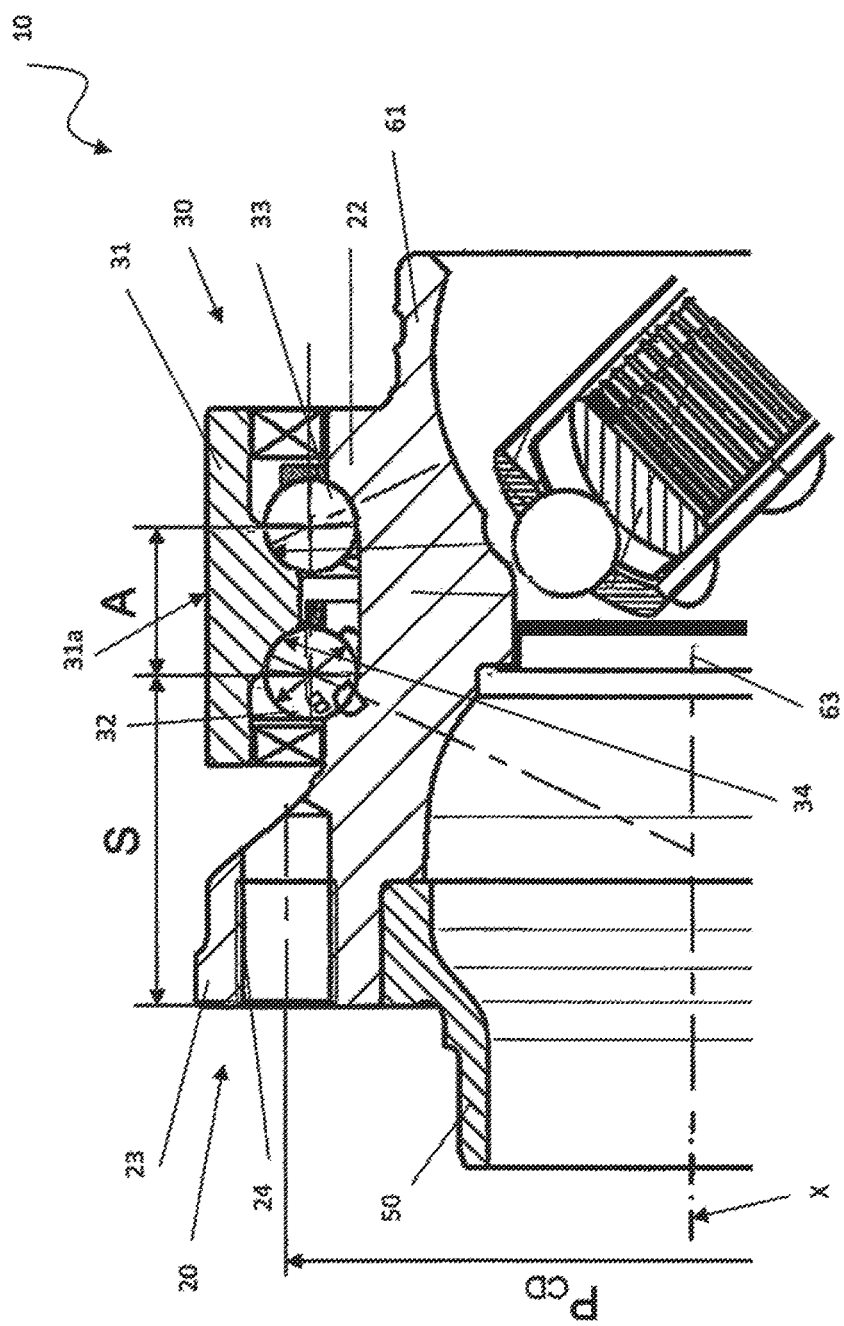
FIG. 4 is an axially symmetrical section through the hub-bearing unit of FIG. 1, showing the constant velocity joint in another position.

In the first place, this applies to the axial distance L between the center of the axially inner crown of rolling bodies and the rolling center of the constant velocity joint. This axial distance L is conventionally considered to be positive if the rolling center of the constant velocity joint is in an axially inner position relative to the center of the axially inner crown of rolling bodies (See FIG. 4). Conversely, the distance L has a negative value if the rolling center of the constant velocity joint is in an axially outer position relative to the center of the axially inner crown of rolling bodies. Greater optimization, in terms of high strength and reduced weight of the unit, is obtained if:

$$\begin{cases} \text{with } L \geq 0, & 0.4 \leq \dfrac{P_B}{S+A+L} \leq 4 \\ \text{with } L < 0, & 0.5 \leq \dfrac{P_B}{S+A} \leq 4 \end{cases} \quad (1)$$

where:

L is the axial distance between the center of the axially inner crown 33 of the rolling bodies and the rolling center of the constant velocity joint, PB is the pitch diameter of the crowns 32, 33 of rolling bodies, S is the axial distance between the axially outer surface of the flange 23 and the center of the axially outer crown 32 of rolling bodies, A is the axial distance between the centers of the crowns 32, 33 of rolling bodies.

The ratio defined by formula (1) determines the overall dimensions of the hub-bearing unit. A ratio tending towards the lower limit (0.4 or 0.5, as the case may be) might be preferable if the priority guiding the development of the unit is the driveability of the vehicle. Evidently, if the ratio fell below the lower limit, this would reduce the advantage of strength provided by the increase in the pitch diameter, and would cause the unit to be configured with a large axial extension relative to the radial extension. The latter condition could also create some problems in production processes such as forging or equivalent procedures.

A higher ratio, that is to say one tending towards the upper limit of 4, is preferable if the design of the unit is based on a desire for weight reduction and compactness. It is inadvisable to exceed the value of the ratio defined by formula (1), in order to avoid over-dimensioning the unit and losing the benefits of its optimization.

Advantageously, another geometrical ratio to be monitored is given by the following formula:

$$\frac{2L}{D_B + D_J} \leq 2.5 \quad (2)$$

where, in addition to the symbols already noted,
DB is the diameter of the rolling bodies,
DJ is the diameter of the balls of the constant velocity joint.

This ratio controls the axial extension of the unit. For some applications, if the design priority is the driveability of the vehicle, a higher value of the ratio may be recommended. However, if axial compactness is a desired outcome of the design, lower values are preferable. In any case, it is inadvisable to exceed the threshold value of 2.5, particularly if this is caused by a high value of L, in order to avoid the positioning of the rolling center of the constant velocity joint too far towards the axially inner side of the unit relative to the races and rolling bodies of the bearing.

Preferably, another geometrical ratio that should be carefully checked is given by the following formula:

$$1 \leq \frac{P_B - D_B}{P_J + D_J} \leq 3 \quad (3)$$

where, in addition to the symbols already noted,
PJ is the pitch diameter of the constant velocity joint.

This ratio is associated with the robustness of the hub-bearing unit. For optimal load transmission, it is advisable for the ratio to be at least greater than 1, to ensure a minimum thickness of the tubular portion 21 of the hub 20. If the value fell below 1, this would also cause the resulting shape of the tubular portion 21 to be non-optimal in terms of the forming process.

On the other hand, it is preferable to keep below the upper limit of 3. Although the aim of the solution is to increase the strength or rigidity of the unit, it is equally important to control the weight, and therefore the cost. Excessively high values of the ratio would make the present solution unattractive to customers in terms of its appearance.

Finally, a further ratio to be monitored is given by the following formula:

$$0.7 \leq \frac{P_{CD}}{P_B} \leq 2.6 \quad (4)$$

where, in addition to the symbols already noted,
PCD is the diameter of the circumference of the axes of the axial holes 24 for fixing the brake disc to the hub-bearing unit.

For this solution, the ratio PCD/PB is also important. As mentioned above, one of the key aspects of this solution is the tubular or rotor-like shape, which reduces the radial extension of the flange portion. If the values of the ratio exceed 2.6, the desired advantages of strength would be completely lost. On the other hand, since the compromise between strength and weight is nearly always one of the main design objectives, if not the only one, a value of less than 0.7 would result in a virtually unavoidable loss of attractiveness in the identified solution.

To summarize, one of the main advantages of this solution is the increased strength, as regards both the rolling bodies and the flange portion of the hub.

Another advantage is the integration of more components, with positive effects on cost, on the removal of critical interfaces, and therefore on performance. The interfaces that are removed are those relating to:

the use of a single inner ring, in place of the two conventionally used: in this case, there is no need to press-fit one ring on to the other, or to carry out the consequent adjustment operations. Clearly, there is no risk of relative rotation between the two rings, nor any need for plastic deformation of the radially and axially inner ring;

the integration between the hub and the bell of the constant velocity joint, resulting in the elimination of the grooved connection between the two components that is present in standard versions. Consequently, there are no problems due to any play between the two components or the resulting noise that would occur when the direction of application of the load was changed; there is no need to broach a grooved profile, nor any requirement for heat treatment of a constant velocity joint with a grooved profile. Furthermore, dispensing with the interface required for torque transmission eliminates a possible failure mode in critical applications. Finally, there is no need for a bolt to lock the constant velocity joint on to the bearing.

The reduction of interfaces has the collateral effect of requiring less storage space for material, given that, in order to provide a sufficiently robust interface, the facing components of the interface must be sufficiently thick, whereas, if there is only one component, the overall thickness is usually smaller.

It is to be understood that the invention is not limited to the embodiments described and illustrated herein, which are to be considered as examples of the unit; it will be evident to persons skilled in the art that various changes may be made to the functions and configuration of the elements described as exemplary embodiments, without departure from the scope of the invention as defined in the appended claims and in their equivalents.

The invention claimed is:
1. A hub-bearing unit comprising:
a rotatable hub, provided with a flange portion on an axially external longitudinal end, the flange portion being configured for the engagement with a rotatable element of a motor vehicle, the rotatable hub comprising a central tubular portion formed as a one piece component, a bearing unit having a stationary radial outer ring which forms an outer raceway having an outer raceway protrusion which extends radially inwardly from the outer ring, configured for the engagement with a fixed element of the motor vehicle, a first crown of axially external rolling bodies, a second crown of axially internal rolling bodies, interposed between the radially outer ring and the hub, the first crown of axially external rolling bodies being spaced from the second crown of axially internal rolling bodies by the outer raceway protrusion, the first crown of axially external rolling bodies and the second crown of axially external rolling bodies being located in a single groove in the central tubular portion, a surface of the groove extending axially between the first crown of axially external rolling bodies and the second crown of axially external rolling bodies so as not to form a protuberance therebetween, wherein the hub also assumes the function of the radially inner ring, which is formed by the single groove, of the bearing unit and the bell of a constant velocity joint, the stationary radial outer ring being a one piece member wherein the rolling center of the constant velocity joint is in a position axially internal with respect to the center of the axially inner crown of the rolling bodies, wherein the hub-bearing unit is further configured such that zero point five (0.5) is less than or equal to a ratio of $P_B$ to the sum of S and A and the ratio is also less than or equal to four (4), wherein $P_B$ is a pitch diameter of the crowns of the rolling bodies, S is an axial distance between the axially outer surface of the flange and the center of the axially outer crown of the rolling bodies, A is an axial distance between the centers of the crowns of the rolling bodies, first and second seals located adjacent axial ends of the outer ring, the first and second seals being completely axially overlapped by both the outer ring and the hub, a bushing rigidly connected to the flange portion of the hub such that the bushing centers the rotatable element of the motor vehicle, the bushing defining a central passageway which extends axially therethrough, and a protection cap located within the hub and configured to contain grease inside the constant velocity joint, the protection cap being attached to a radially inner surface of the hub, the protection cap is located axially between and is axially spaced from the bushing and the constant velocity joint.

2. The hub-bearing unit according to claim 1, wherein an axial distance between the center of the axially inner crown of the rolling bodies and the rolling center of the constant velocity joint (L), a diameter of the rolling bodies ($D_B$) and a diameter of the balls of the constant velocity joint ($D_J$) are in accordance with the following relationship:

$$\frac{2L}{D_B + D_J} \leq 3.$$

3. The hub-bearing unit according to claim 2, wherein the pitch diameter ($P_B$) of the crowns of the rolling bodies, the diameter ($D_B$) of the rolling bodies, the pitch diameter ($P_J$) of the constant velocity joint and the diameter ($D_J$) of the balls of the constant velocity joint are in accordance with the following relationship:

$$1 \leq \frac{P_B - D_B}{P_J + D_J} \leq 2.5.$$

4. The hub-bearing unit according to claim 2, wherein the diameter ($P_{CD}$) of the circumference of the axes of axial holes for fixing the hub to the rotatable element of the motor vehicle and the pitch diameter ($P_B$) of the crowns of the rolling bodies are in accordance with the following relationship:

$$0.7 \leq \frac{P_{CD}}{P_B} \leq 2.6.$$

5. The hub-bearing unit according to claim 1, wherein the bushing is configured to be made in a single piece with the hub.

6. The hub-bearing unit according to claim 1, wherein the hub assumes a web structure with a stiffening portion discoid shaped which seals the volume which contains the constant velocity joint.

7. The hub-bearing unit according to claim 6, wherein the stiffening portion is provided with one or more undercuts.

* * * * *